Patented Oct. 18, 1949

2,485,100

UNITED STATES PATENT OFFICE 2,485,100

LACTONIZATION OF 2,4-POLYHALOGENO-ALKANOIC ESTERS

Elbert C. Ladd, Passaic, and Herbert Sargent, Wood-Ridge, N. J., assignors to United States Rubber Company, New York, N. Y., a corporation of New Jersey No Drawing. Application September 25, 1948, Serial No. 51,312

5 Claims. (Cl. 260—344)

The invention relates to a novel method for the synthesis of lactones of 4-hydroxy-2-oxyalkanoic acids. More specifically, our invention concerns the reaction of 2,4-polyhalogenoalkanoic esters of the type formula $R^xO-CO-CXR^*-CHR-CXR'R''$ to form lactones of the formula

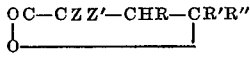

In this formula $R^x$ is lower alkyl (e. g., methyl, ethyl, and propyl); each X is chlorine or bromine; $R^*$ may either be X (in which case Z and Z' together represent oxygen), or $R^*$ may be a hydrocarbon or substituted hydrocarbon group such as alkyl (e. g., methyl, ethyl, propyl, isopropyl, butyl, amyl, cyclopentyl, hexyl, cyclohexyl, heptyl, octyl, nonyl, decyl, undecyl, dodecyl, tridecyl, tetradecyl, pentadecyl, hexadecyl heptadecyl, octadecyl, nonadecyl and eicosanyl), alkenyl (e. g., vinyl and 2-propenyl), aryl (e. g., phenyl, tolyl, xylyl, xenyl, naphthyl), p-chlorophenyl, o,p-dichlorophenyl, p-fluorophenyl, p-methoxyphenyl, and aralkyl (e. g., benzyl and phenethyl); (in which case Z' is defined the same as $R^*$, and Z is hydroxyl); R is hydrogen, methyl, phenyl, carboxyl, a group which is hydrolyzable to carboxyl (including carbanhydro, carbalkoxy, carbaryloxy, carbarylalkoxy, carbonitrilo and carbamyl), carboxyalkyl (e. g., carboxymethyl), a group which is hydrolyzable to carboxyalkyl (e. g., carbonitrilomethyl), haloalkyl (e. g., chloromethyl) and acyloxyalkyl (e. g., acetoxymethyl, benzoyloxymethyl and phenacetoxymethyl); R' and R'' may be any of the groups in the definition of R, in which case at least one of R, R' and R'' is hydrogen, and R is hydrogen when R' and R'' are hydrogen, or R'' may instead be selected from the class consisting of alkyl, alkenyl, aryl, aralkyl, cycloalkenyl ( e. g., 4-cyclohexenyl), acyl (e. g., aceto), acylalkyl (e. g., acetomethyl), alkoxyalkyl (e. g., methoxymethyl, ethoxymethyl, ethoxyethyl and methoxynonyl), aryloxyalkyl (e. g., phenoxymethyl, p-chlorophenoxymethyl, and p-methoxyphenyl), aralkoxyalkyl (e. g., benzyloxymethyl), and the corresponding alkylmercaptoalkyl, arylmercaptoalkyl, and aralkylmercaptoalkyl, and pyridyl, furyl, and thienyl; or R and R' may together be ethylene, trimethylene, or tetramethylene.

In view of such possible wide variations in the secondary substituents, it can be stated that generically the starting chemicals subscribe to the general formula

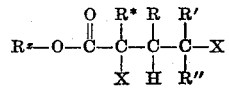

$R^x$ being a lower alkyl group; X being halogen; $R^*$ being halogen, hydrocarbon or a substituted hydrocarbon group; R, R' and R'' each being one of the radicals hydrogen, hydrocarbon or a substituted hydrocarbon group.

These starting materials for use in our invention can themselves be readily prepared by heating, e. g., at 25–120° C., an olefinic compound of the type formula $RCH=CR'R''$ with from 1 to 20 molar equivalents of a halo-acid ester

in the presence of a source of free radicals, e. g., a peroxidic compound, such as benzoyl peroxide. This is illustrated by reaction (1) below:

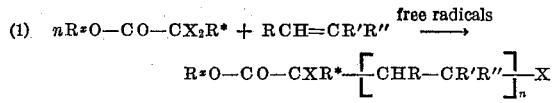

$n$ being a small integer, e. g., 1–5. The products of this reaction wherein $n=1$ are those employed in our invention.

An alternate method for synthesizing a number of these starting materials consists in carrying out the free-radical catalyzed reaction of an olefinic compound $RHC=CR'R''$ with an alpha-bromo acid ester $R^o-CHBr-COOR^x$ where $R^o$ is hydrogen, hydrocarbon or a substituted hydrocarbon group, and halogenating the resulting 1:1 adduct. For example:

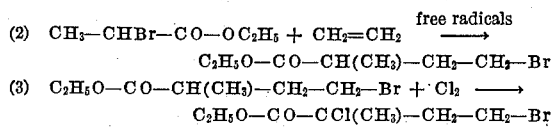

Although the alpha-halogenoalkanoic esters of the above class are the preferred class of starting materials, the corresponding carboxylic acid nitriles can likewise be employed.

The method of our invention comprises heating the 2,4-polyhalogenoalkanoic ester, defined above, at 25–150° C. in the presence of water, and preferably in the presence of a basic material as well, for reaction times in the range of 1–200 hours, and usually in the range of 1–50 hours. The amount of water employed may vary widely, but from 1 to 20, and preferably 2 to 10, molar equivalents of water per mole of the 2,4-polyhalogenoalkanoic ester will generally prove adequate, while from 2 to 6 molar equivalents of the basic substance are likewise preferred. Of the basic substances operable in our invention, we have found the inorganic bases to be particularly effective. Of these the alkali metal hydroxides (e. g., sodium hydroxide and potassium hydroxide) as well as the corresponding alkali metal carbonates and bicarbonates (e. g., sodium carbonate, potassium bicarbonate) are preferred, the carbonate and bicarbonate salts being especially preferred. Inert diluents such as alcohols (e. g., ethanol) may be employed to homogenize the reaction mixture. The reaction of our invention is illustrated in (4) below:

(4) 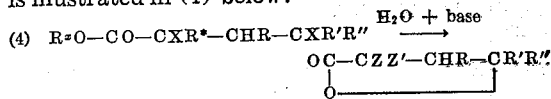

In particular, the reaction of our invention as applied to a 2,4-polyhalogenoalkanoic ester in which $R^x$ is ethyl, X is chlorine, $R^*$ is chlorine, and R, R' and R'' are hydrogen, is as follows:

(5) 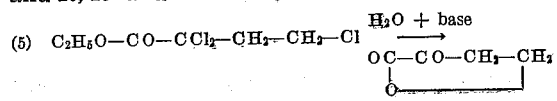

Similarly when $R^*$ is methyl instead of chlorine:

(6) 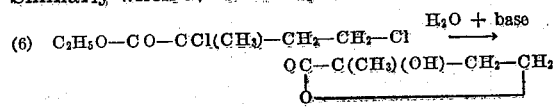

The reaction products can be isolated and purified by extraction, fractional distillation and/or crystallization. This wide variety of compounds obtainable by the method of our invention are useful not only as plasticizers for polymeric materials but also as synthetic intermediates, particularly for the preparation of pharmaceuticals.

The preferred classes of 2,4-polyhalogenoalkanoic esters for use in our invention, and the lactones obtained therefrom, are as follows, $R^x$, $R^*$, R, R', R'' and X being as previously defined:

Class A: 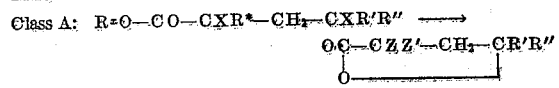

Class B: 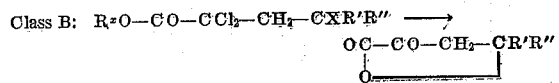

where R' is hydrogen or methyl, and R'' is hydrogen, alkyl, carboxyalkyl or a group hydrolyzable thereto or acyloxymethyl.

Class C: 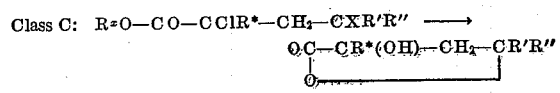

where $R^*$ is a substituent other than halogen.

Class D: 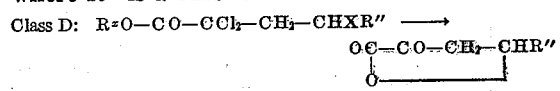

where R'' is hydrogen, alkyl, carboxyalkyl or a group hydrolyzable thereto or acyloxymethyl.

Class E: 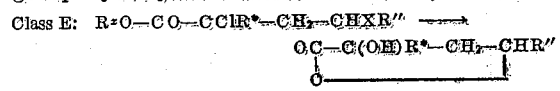

where $R^*$ is alkyl or aryl, and R'' is hydrogen, alkyl, carboxyalkyl or a group hydrolyzable thereto or acyloxymethyl.

Further illustrative examples are given in Table I including the olefinic compounds and the 2,2,-polyhalogenoalkanoic esters from which the 2,4-polyhalogenoalkanoic esters employed in our invention are derived.

The following examples disclose our invention in more detail. All parts are by weight.

*Example 1*

(a) A mixture of 374 parts of ethyl trichloroacetate, 55 parts of octene-1 and 4.7 parts of benzoyl peroxide is heated at 70–80° C. for 24 hours. Fractional distillation of the reaction mixture yields 81 parts of the new compound, ethyl 2,2,4-trichlorodecanoate, B. 106° C./0.2 mm.; $n_D^{20}$ 1.4681; sp. g. (20°/20°) 1.1395; chlorine content, 34.60% (theory, 34.9%). The residue from the distillation, amounting to 13 parts, is mainly a new compound believed to be ethyl 2,2,6-trichloro-4-hexyldodecanoate, chlorine content 26.78% (theory, 25.5%).

(b) To a solution of 35 parts of sodium carbonate in 55 parts of ethanol and 125 parts of water are added 30.3 parts of ethyl 2,2,4-trichlorodecanoate and the mixture is refluxed for a total of 120 hours. The reaction mixture is then cooled, diluted with an equal volume of water, acidified by the addition of concentrated hydrochloric acid and extracted with a 50:50 mixture of ethyl ether and n-hexane. The extract is dried, evaporated to remove the solvents, and the residue is fractionally distilled to yield 3 parts of a new compound, considered to be the lactone of 4-hydroxy-2-oxodecanoic acid, boiling in the range 95–125°C./1 mm. The 2,4-dinitrophenylhydrazone of the lactone after recrystallization from methanol melts at 128–128.5° C.

(c) The ethyl 2,2,4-trichlorodecanoate prepared above is reduced by dissolving 30.25 parts thereof in 48 parts of ethanol and admixing with it a suspension of approximately 0.3 part of platinum oxide in 7.8 parts of ethanol which has been previously treated with hydrogen until absorption ceases. The mixture is then enclosed in a vessel connected to a source of hydrogen at atmospheric pressure and about 25° C. At the end of 1 hour the reaction is interrupted while a solution of 0.51 part of ammonia in 6.2 parts of ethanol is added. The reaction is then resumed and at the end of an additional hour the absorption of hydrogen virtually ceases, a total of 0.122 part of hydrogen having been absorbed. The reaction mixture is then diluted with 3 volumes of water and extracted with several portions of petroleum ether (a commercial mixture of aliphatic hydrocarbons comprising mostly pentane, hexane and heptane). The extract is dried and fractionally distilled to yield 19 parts of the new compound, ethyl 2,4-dichlorodecanoate, B. 118–120° C./2 mm. Upon treatment with alcoholic ammonia the ester is converted to the corresponding 2,4-dichlorodecanoamide, which melts at 95.5–96.0° C. after recrystallization from petroleum ether.

A solution of 26.9 parts of the ethyl 2,4-dichlorodecanoate and 40 parts of potassium carbonate in a mixture of 110 parts of water and 59 parts of ethanol is refluxed for 100 hours. The reaction mixture is then cooled, diluted with an equal volume of water, acidified with concentrated hydrochloric acid, and extracted with n-hexane. The extract is dried and fractionally Table I

| | Olefinic Compound RCH=CR'R'' | 2,2-Polyhalogeno-Alkanoic Acid Ester R×O—CO—CX₃R* | 2,4-Polyhalogeno-Alkanoic Acid Ester R×O—CO—CXR*—CHR—CXR'R'' | 4-Hydroxy-2-Oxyalkanoic Acid Lactone OC—OZZ'—CHR—OR'R'' |
|---|---|---|---|---|
| 1 | CH₂=CH₂ | C₂H₅O—CO—CCl₃ | C₂H₅O—CO—CCl₂—CH₂—CH₂Cl | OC—CO—CH₂—CH₂ (lactone ring with O) |
| 2 | CH₂=CH—CH₃ | C₂H₅O—CO—CCl₃ | C₂H₅O—CO—CCl₂—CH₂—CHCl—CH₃ | OC—CO—CH₂—CH—CH₃ (lactone ring with O) |
| 3 | CH₂=CH₂ | CH₃O—CO—CBr₂—CH₃ | CH₃O—CO—CBr(CH₃)—CH₂—CH₂Br | OC—C(OH)(CH₃)—CH₂—CH₂ (lactone ring with O) |
| 4 | CH₂=C(CH₃)₂ | C₂H₅O—CO—CCl₂—CH₃ | C₂H₅O—CO—CCl(CH₃)—CH₂—CCl(CH₃)₂ | OC—C(OH)(CH₃)—CH₂—C(CH₃)₂ (lactone ring with O) |
| 5 | CH(CH₃)=CH—CH₃ | C₂H₅O—CO—CCl₃ | C₂H₅O—CO—CCl₂—CH(CH₃)—CHCl—CH₃ | OC—CO—CH(CH₃)—CH—CH₃ (lactone ring with O) |
| 6 | CH₂=CH—(CH₂)₅—CH₃ | CH₃O—CO—CCl₃ | CH₃O—CO—CCl₂—CH₂—CHCl—(CH₂)₅—CH₃ | OC—CO—CH₂—CH—(CH₂)₅—CH₃ (lactone ring with O) |
| 7 | CH₂=CH—(CH₂)₅—CH₃ | CH₃O—CO—CCl₂—C₂H₅ | CH₃O—CO—CCl(C₂H₅)—CH₂—CHCl—(CH₂)₅—CH₃ | OC—C(OH)(C₂H₅)—CH₂—CH—(CH₂)₅—CH₃ (lactone ring with O) |
| 8 | CH₂=CH₂ | CH₃O—CO—CCl₂—(CH₂)₇—CH₃ | CH₃O—CO—CCl[(CH₂)₇—CH₃]—CH₂—CH₂Cl | OC—C(OH)[(CH₂)₇—CH₃]—CH₂—CH₂ (lactone ring with O) |
| 9 | CH₂=CH₂ | CH₃O—CO—CCl₂—C₆H₅ | CH₃O—CO—CCl(C₆H₅)—CH₂—CH₂Cl | OC—C(OH)(C₆H₅)—CH₂—CH₂ (lactone ring with O) |
| 10 | CH₂=C(CH₃)₂ | CH₃O—CO—CCl₂—C₆H₄ | CH₃O—CO—CCl(C₆H₄—OCH₃)—CH₂—CCl(CH₃)₂ | OC—C(OH)(C₆H₄—OCH₃)—CH₂—C(CH₃)₂ (lactone ring with O) |
| 11 | CH₂=CH—C₆H₅ | C₂H₅O—CO—CBr₂—CH₃ | C₂H₅O—CO—CBr(CH₃)—CH₂—CHBr—C₆H₅ | OC—C(OH)(CH₃)—CH₂—CH—C₆H₅ (lactone ring with O) |
| 12 | CH₂=CH—C₆H₄—Cl | C₂H₅O—CO—CBr(C₂H₅)—C₂H₅ | C₂H₅O—CO—CBr(C₂H₅)—CH₂—CHBr—C₆H₄—Cl | OC—C(OH)(C₂H₅)—CH₂—CH—C₆H₄—Cl (lactone ring with O) |
| 13 | CH₂=C(CH₃)—C₆H₅ | C₂H₅O—CO—CClBr—CH₃ | C₂H₅O—CO—CCl(CH₃)—CH₂—CBr(CH₃)—C₆H₄—CH₃ | OC—C(OH)(CH₃)—CH₂—C(CH₃)—C₆H₄—CH₃ (lactone ring with O) |
| 14 | C₆H₅—CH=CH—C₆H₅ | C₂H₅O—CO—CBr₂—(CH₂)₃ | C₂H₅O—CO—CBr[(CH₂)₃—CH₃]—CH(C₆H₅)—CHBr—C₆H₅ | OC—C(OH)[(CH₂)₃—CH₃—CH(C₆H₅)—CH—C₆H₅ (lactone ring with O) |

Table I—Continued

| | Olefinic Compound ROH=OR'R'' | 2,2-Polyhalogeno-Alkanoic Acid Ester R$^x$C—CO—OX$_2$R* | 2,4-Polyhalogeno-Alkanoic Acid Ester R$^x$O—CO—CXR*—CHR—OXR'R'' | 4-Hydroxy-2-Oxyalkanoic Acid Lactone OC—OZZ'—CHR—OR'R'' |
|---|---|---|---|---|
| 15 | CH$_2$=CH—CH$_2$Cl | C$_2$H$_5$O—CO—CCl$_3$ | C$_2$H$_5$O—CO—CCl$_2$—CH$_2$—CHCl—CH$_2$Cl | OC—CO—CH$_2$—CH—CH$_2$Cl<br>└—O—┘<br>↑<br>OC—CO—CH—CH=CH$_2$<br>└—O—┘ |
| 16 | CH$_2$=CH—CH$_2$—OCO—CH$_3$ | C$_2$H$_5$O—CO—CCl$_3$ | C$_2$H$_5$O—CO—CCl(CH$_3$)—CH$_2$—CHCl—CH$_2$—OCO—CH$_3$ | OC—C(OH)(CH$_3$)—CH$_2$—CH—CH$_2$—OCO—CH$_3$<br>└———O———┘<br>↑<br>OC—C(OH)(CH$_3$)—CH$_2$—CH—CH$_2$—OH<br>└———O———┘ |
| 17 | CH$_2$=CH—CH$_2$—OC$_2$H$_5$ | CH$_3$O—CO—CCl$_2$—(CH$_2$)$_{15}$—CH$_3$ | CH$_3$O—CO—CCl[(CH$_2$)$_{15}$—CH$_3$]—CH$_2$—CHCl—CH$_2$—OC$_2$H$_5$ | OC—C(OH)[(CH$_2$)$_{15}$—CH$_3$]—CH$_2$—CH—CH$_2$—OC$_2$H$_5$<br>└————O————┘ |
| 18 | CH$_2$=CH—CH$_2$—OC$_6$H$_4$Cl | CH$_3$O—CO—CCl$_2$—C$_2$H$_5$ | CH$_3$O—CO—CCl(C$_2$H$_5$)—CH$_2$—CHCl—CH$_2$—OC$_6$H$_4$Cl | OC—C(OH)(C$_2$H$_5$)—CH$_2$—CH—CH$_2$—OC$_6$H$_4$Cl<br>└————O————┘ |
| 19 | CH$_2$=CH—CH$_2$—CN | CH$_3$O—CO—CCl$_3$ | CH$_3$O—CO—CCl$_2$—CH$_2$—CHCl—CH$_2$—CN | OC—CO—CH$_2$—CH—CH$_2$—CN<br>└———O———┘<br>↑<br>OC—CO—CH$_2$—CH$_2$—COOH<br>└———O———┘ |
| 20 | CH$_2$=CH—(CH$_2$)$_8$—CO—OCH$_3$ | CH$_3$O—CO—CCl$_3$ | CH$_3$O—CO—CCl$_2$—CH$_2$—CHCl—(CH$_2$)$_8$—CO—OCH$_3$ | OC—CO—CH$_2$—CH—(CH$_2$)$_8$—CO—OCH$_3$<br>└———O———┘ |
| 21 | CH$_3$—CH=CH—CH$_3$ | C$_2$H$_5$O—CO—CHBr$_2$ | C$_2$H$_5$O—CO—CHBr—CH(CH$_3$)—CHBr—CH$_3$ | OC—CH(OH)—CH(CH$_3$)—CH—CH$_3$<br>└———O———┘ |
| 22 | CH$_2$=CH$_2$ | (C$_2$H$_5$O—CO—)$_2$CBr$_2$ | (C$_2$H$_5$O—CO—)$_2$CBr—CH$_2$—Br | OC—CH(OH)—CH$_2$—CH$_3$<br>     \|<br>     CO—OC$_2$H$_5$ |
| 23 | CH$_2$=CH—CH$_3$ | C$_2$H$_5$O—CO—CBr$_2$—(CH$_2$)$_7$—CH$_3$ | C$_2$H$_5$O—CO—CBr[(CH$_2$)$_7$CH$_3$]—CH$_2$—CHBr—CH$_3$ | OC—C(OH)[(CH$_2$)$_7$CH$_3$]—CH$_2$—CH—CH$_3$<br>└————O————┘ |
| 24 | CH$_2$=CH—(CH$_2$)$_5$CH$_3$ | NC—CCl$_3$ | NC—CCl$_2$—CH$_2$—CHCl—(CH$_2$)$_5$CH$_3$ | OC—CO—CH$_2$—CH—(CH$_2$)$_5$CH$_3$<br>└———O———┘ |
| 25 | CH$_2$=CH—C$_6$H$_5$ | NC—CHBr$_2$ | NC—CHBr—CH$_2$—CHBr—C$_6$H$_5$ | OC—CH(OH)—CH$_2$—CH—C$_6$H$_5$<br>└———O———┘ | distilled to yield 9 parts of the new compound the lactone of 2,4-dihydroxydecanoic acid; the lactone B. 133–135° C./1 mm.; M. 42.5–43.0° C. after recrystallization from n-hexane.

The same 2-hydroxylactone can likewise be obtained by refluxing a solution of 35.8 parts of ethyl 2,4-dibromodecanoate and 45 parts of potassium carbonate in a solution of 75 parts of water and 59 parts of ethanol for 96 hours. The product is isolated and purified in the manner described above.

Example 2

A pressure vessel containing 1375 parts of ethyl trichloroacetate and 29 parts of benzoyl peroxide is filled with ethylene until a pressure of about 120 p. s. i. at 20° C. is obtained. The reaction vessel is then heated with shaking at about 95° C. for 6 hours, and a pressure of 170–190 p. s. i. is maintained therein by addition of ethylene. At the end of the reaction, the vessel is opened, the contents are filtered and the liquid filtrate is fractionally distilled to yield 60 parts of the new compound ethyl 2,2,4-trichlorobutyrate, B. 62–4° C./2 mm.; $n_D^{20}$ 1.4680; sp. g. (20°/20°) 1.3080; chlorine content, 47.98% (theory, 48.52%).

The undistilled liquid residue from the above distillation is dissolved in benzene, washed with dilute aqueous sodium bicarbonate solution, dried and evaporated to remove the benzene. The residue is then fractionally distilled to yield 61 parts of a new compound considered to be ethyl 2,2,6-trichlorohexanoate. B. 104–108° C./3 mm.; $n_D^{20}$ 1.4748; sp. g. (20°/20°) 1.272; chlorine content, 43.13% (theory, 43.03%). The residue from the distillation, amounting to 12 parts, is believed to be mainly the new compound, ethyl 2,2,8-trichlorooctanoate, chlorine content, 40.48% (theory, 38.4%).

Upon heating ethyl 2,2,4-trichlorobutyrate with an excess of sodium carbonate dissolved in aqueous ethanol the corresponding 2-oxobutyrolactone is obtained.

Example 3

Four hundred and thirty parts of ethyl 2,2,3-trichlorobutyrate are mixed with 74 parts of octene-1, 6.5 parts of benzoyl peroxide are added, and the mixture is heated at ca. 78° C. for 24.5 hours. Six and five-tenths parts of peroxide are then added and heating at 78° C. is resumed and continued for 24 hours. The reaction mixture is then fractionally distilled to yield 51.7 parts of a new compound considered to be ethyl 2,4-dichloro-2-(alpha-chloroethyl)decanoate, B. 136–141° C./0.3 mm.; chlorine content 30.3% (theory, 32.1%).

The new ester of Example 3 reacts with a hot solution of sodium carbonate in aqueous ethanol to yield a new compound considered to be the gamma lactone of 2-(alpha-chloroethyl)-2,4-dihydroxydecanoic acid.

Example 4

A mixture of 1180 parts of ethyl trichloroacetate, 72 parts of allyl acetate and 8.7 parts of benzoyl peroxide is heated for 48 hours at 80–90° C. The unreacted starting materials are then distilled off and the liquid residue is washed with dilute aqueous sodium bicarbonate and dried. Fractional distillation of the material yields 14 parts of a new compound considered to be ethyl 5-acetoxy-2,2,4-trichloropentanoate, B. 125–130° C./2 mm.; $n_D^{20}$ 1.4748; sp. g. (20°/20°) 1.3205; chlorine content, 35.71% (theory, 36.48%). The residue, amounting to 47 parts, is mainly a new compound considered to be ethyl 7-acetoxy-4-acetoxymethyl-2,2,6-trichloroheptanoate; chlorine content, 26.97% (theory, 26.90%).

The ethyl 5-acetoxy-2,2,4-trichloropentanoate reacts with warm aqueous potassium hydroxide to yield a mixture of the gamma and delta lactones of 2-oxo-4,5-dihydroxypentanoic acid.

Having thus described our invention, what we claim and desire to protect by Letters Patent is:

1. A method of making lactones which comprises subjecting a 2,4-polyhalogenoalkanoic ester of the general formula

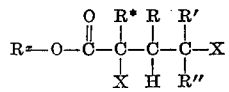

to the action of water at a temperature of from 25–150° C. and afterwards isolating the formed lactone; $R^x$ being a lower alkyl group; X being halogen; R* being a member from the class consisting of halogen, hydrogen, and hydrocarbon; R, R' and R" each being from the class consisting of hydrogen, hydrocarbon, carboxyl, carboxyalkyl, acyloxyalkyl, and alkoxyalkyl.

2. A method of making lactones which comprises subjecting a 2,4-polyhalogenoalkanoic ester of the general formula

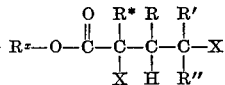

to the action of water, in the presence of an inorganic basic substance, at a temperature of from 25–150° C. and afterwards isolating the formed lactones; $R^x$ being a lower alkyl group; X being halogen; R* being a member from the class consisting of halogen, hydrogen, and hydrocarbon; R, R' and R" each being from the class consisting of hydrogen, hydrocarbon, carboxyl, carboxyalkyl, acyloxyalkyl, and alkoxyalkyl.

3. A method of making gamma-alkyl-alpha-oxy lactones which comprises subjecting an alkyl ester of gamma-alkyl-alpha,alpha,gamma-trichlorobutanoic acid to the action of water, at a temperature of from 25–150° C., and afterwards isolating the desired lactone.

4. A method of making gamma-alkyl-alpha-hydroxy butyro lactones which comprises subjecting an alkyl ester of gamma-alkyl-alpha, gamma-dibromo-butanoic acid to the action of water, at a temperature of from 25–150° C., and afterwards isolating the desired lactone.

5. A method of making gamma-alkyl-alpha-hydroxy-alpha-methyl butyro lactones by subjecting an alkyl ester of gamma-alkyl-alpha, gamma-dichloro-alpha-methyl butanoic acid to the action of water, at a temperature of from 25–150° C., and afterwards isolating the desired lactone.

ELBERT C. LADD.
HERBERT SARGENT.

REFERENCES CITED

The following references are of record in the file of this patent:

UNITED STATES PATENTS

| Number | Name | Date |
| --- | --- | --- |
| 2,435,018 | Ruzicka | Jan. 27, 1948 |

Certificate of Correction

Patent No. 2,485,100                                  October 18, 1949

ELBERT C. LADD ET AL.

It is hereby certified that error appears in the printed specification of the above numbered patent requiring correction as follows:

Column 1, lines 8 and 9, for the formula reading $$\overset{OC-CZZ'-CHR-CR'R''}{\underset{O}{\big|_____|}} \quad \text{read} \quad \overset{OC-CZZ'-CHR-CR'R''}{\underset{O}{\big|_____|}}$$

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*